Figure 1:
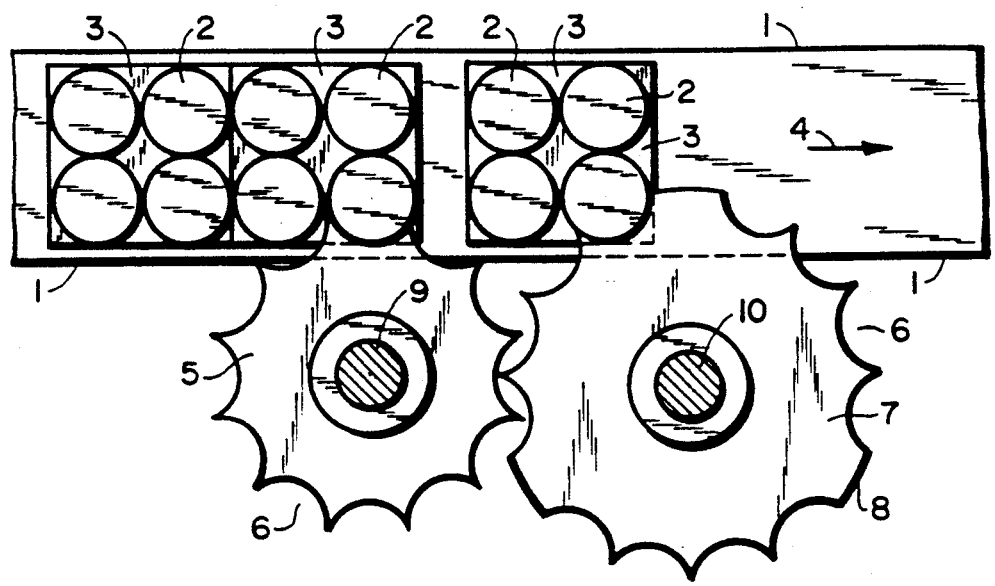

United States Patent [19]

Marceau

[11] Patent Number: 5,082,104
[45] Date of Patent: Jan. 21, 1992

[54] APPARATUS FOR TRANSPORTING AND SEPARATING OBJECTS

[75] Inventor: Daniel Marceau, Beauvais, France

[73] Assignee: Van den Bergh Foods Co., Division of Conopco, Inc., Lisle, Ill.

[21] Appl. No.: 546,171

[22] Filed: Jun. 29, 1990

[51] Int. Cl.⁵ .............................................. B65G 47/26
[52] U.S. Cl. .................. 198/419.3; 198/461
[58] Field of Search ................... 198/419.2, 419.3, 461

[56] References Cited

U.S. PATENT DOCUMENTS

| | | | |
|---|---|---|---|
| 2,744,608 | 5/1956 | Ardell et al. | 198/419.3 |
| 3,680,678 | 8/1972 | Ganz . | |
| 4,093,063 | 6/1978 | Calvert et al. | 198/419.3 |
| 4,195,723 | 1/1980 | Loewenthal . | |
| 4,274,532 | 6/1981 | Johnson | 198/461 |
| 4,274,533 | 6/1981 | Abe . | |

FOREIGN PATENT DOCUMENTS 2023082A 12/1979 United Kingdom .

*Primary Examiner*—Joseph E. Valenza
*Attorney, Agent, or Firm*—Ronald A. Koatz

[57] ABSTRACT

Apparatus for transporting and separating objects that are transported in a continuous row on a conveyor belt and are separated for further processing, where at least two star wheels are located behind each other in transport direction and engage the objects, at least the first of these wheels running at a slower speed than the conveyor belt.

6 Claims, 2 Drawing Sheets

APPARATUS FOR TRANSPORTING AND SEPARATING OBJECTS

DESCRIPTION

The invention relates to an apparatus for transporting and separating objects that are transported in a continuous row on a conveyor belt or similar device and are separated for further processing.

In an apparatus of this kind disclosed in practice, chain conveyors are located next to the conveyor belt, are provide with cams that engage gaps between the objects and run at different speeds, as a result of which the objects are separated.

Although this apparatus works quite reliably, it is not very flexible, as it is difficult to adapt to differing requirements. In addition to this, it is very complicated, so that faults tend to occur and it is comparatively expensive.

The purpose of the invention is to create an apparatus of the kind outlined above that is easy to adapt to different operating conditions and has a simple and thus dependable structure.

In the solution to this problem proposed by the invention, at least two star wheels are located behind each other in transport direction and engage the objects, at least the first of these wheels being driven with a slower speed than the conveyor belt.

The effect of this lower speed of the first star wheel compared with the conveyor belt is to hold the objects back. As soon as they are released by this first star wheel, they move at the sped of the conveyor belt to the second star wheel, so that the required distance to the subsequent object is created.

It is very advantageous if in accordance with the invention the first star wheel engages the last object in the continuous row and the second star wheel engages the separated objects.

This makes sure that the separation of the objects is controlled reliably.

In accordance with the invention, the second star wheel has a higher speed than the first star wheel, which can be the same as or lower than the speed of the conveyor belt.

When several objects are collated to form a connected unit, it is advantageous if in accordance with the invention the perimeter of the second star wheel is provided with at least as many recesses located behind each other as the number of objects arranged in a row per unit, after which a projecting section is provided, the width of which corresponds to the gap between the individually transported units.

This arrangement makes exact separation possible, which facilitates subsequent processing considerably.

It is also very advantageous if in accordance with the invention the distance between the two star wheels can be adjusted and is set to correspond to the size of the collated units.

This makes it very easy to adapt the apparatus to the unit size being processed in each individual case.

It is also very advantageous if in accordance with the invention pairs of star wheels, that are identical and are located on a common drive shaft, are provided above each other.

This makes it possible to separate two units of objects arranged above each other at the same time.

It can also be provided in accordance with the invention that the second star wheel has a larger diameter than the first one.

It is as a result comparatively easy to provide the projecting sections between the recesses.

Four embodiments of the invention are illustrated in the drawings.

Figure 2:
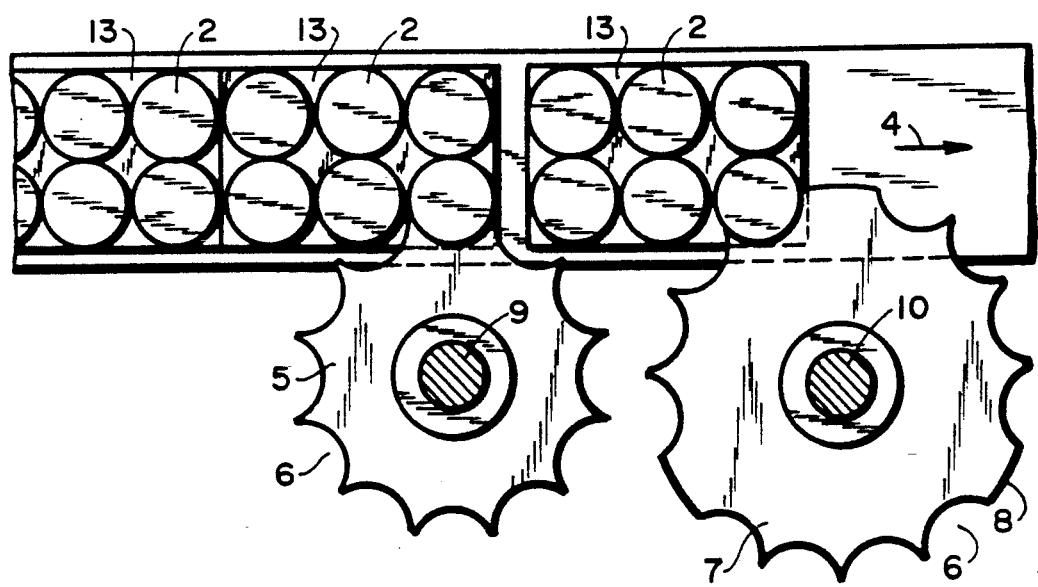
Figure 3:
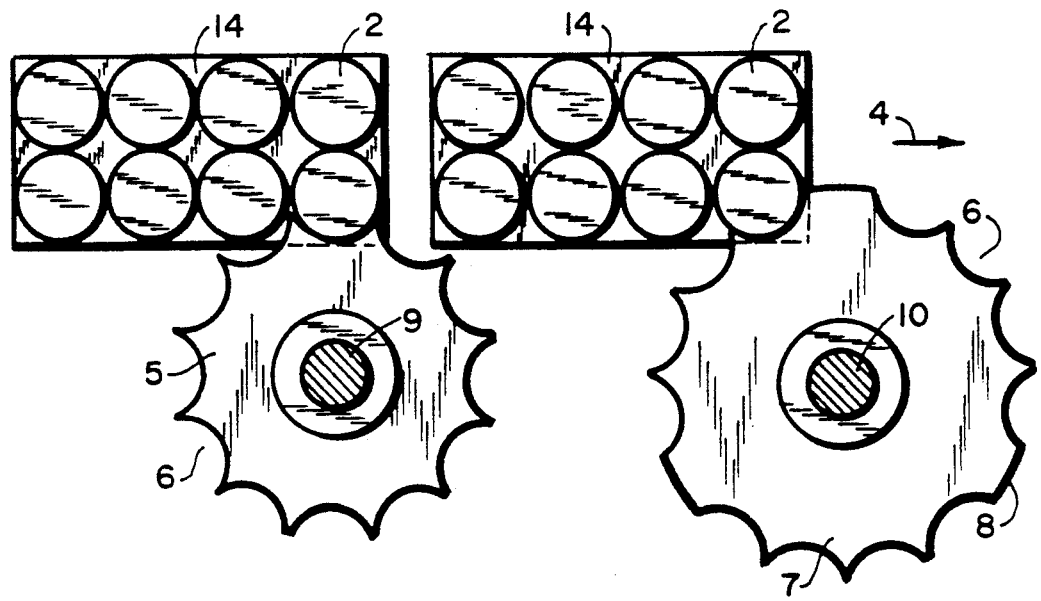
Figure 4:
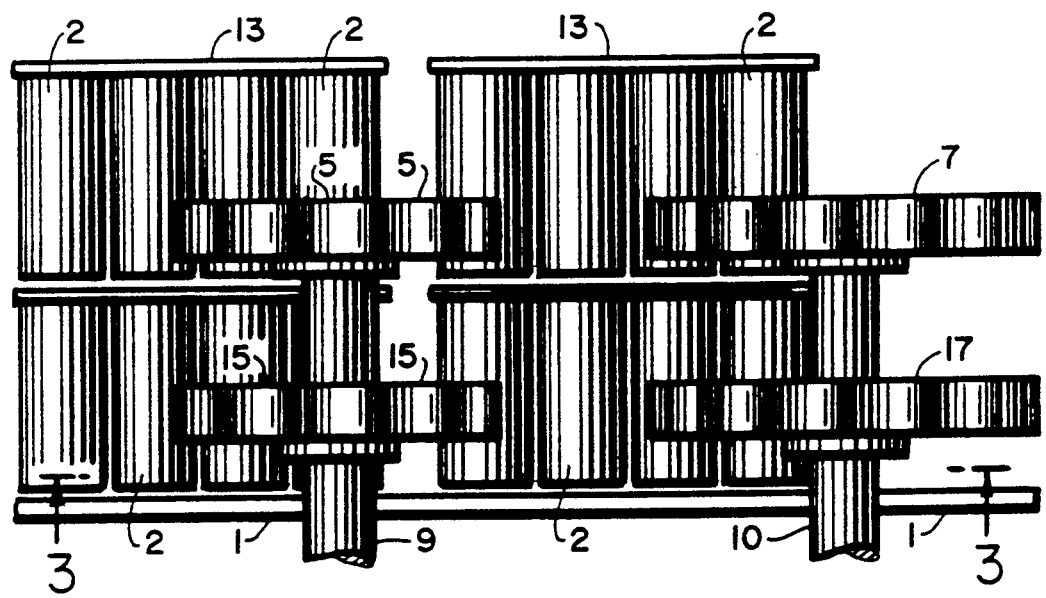

FIG. 1 is a diagrammatic view of an apparatus for separating tub-like containers that are collated in two rows containing two objects each, with two star wheels located behind each other, FIG. 2 is a further view of the apparatus according to FIG. 1 with six tub-like objects collated in a unit, where there is a larger distance between the two star wheels, FIG. 3 is a third view of the same apparatus with eight objects per unit and an even greater distance between the star wheels and FIG. 4 is a side view of the apparatus with two units of eight objects stacked on top of each other and with corresponding pair of star wheels that are located above each other on a common drive shaft.

1 in FIG. 1 is a conveyor belt on which tub-like objects 2 are standing, which have been collated in units 3 of 4 objects in two rows. The objects are yoghurt tubs, the rims of which are connected. The objects 2 move in the direction of the arrow 4 at the speed of the conveyor belt 1 until the first object reaches a first star wheel 5, the speed of which is slower than the speed of the conveyor belt 1. This star wheel 5 turns clockwise and engages the objects in the row facing it with its recesses 6 and holds then back on the conveyor belt. When two objects located behind each other have passed through two consecutive recesses, the star wheel 5 releases the unit, so that the latter can move on at the speed of the conveyor belt 1, while now the following unit is braked by the star wheel 5. A gap, which is limited by a second star wheel 7 against which the front object 2 of the unit released by the first star wheel runs, is thus created between two successive units 3. This second star wheel 7 is also provided with recesses 6, four of which are located next to each other on the perimeter in the embodiment shown. They are followed by a projecting section 8, against the side of which the first object runs. The unit 3 thus moves at a speed that corresponds to the speed of the second star wheel and that may not be slower than the speed of the first star wheel, as otherwise the gap created between two successive units would be eliminated again. The speed of the second star wheel 7 can correspond at most to the speed of the conveyor belt 1.

The distance D between the centers of rotation 9 and 10 of the two star wheels 5 and 6 can be changed according to the length of the units that require separation. It should not be smaller than the total length of the unit, which is determined from the number f of the objects located behind each other multiplied by their diameter d and the width e of the projecting section. For the example shown this means $$D > = f \times d + e = 2d + e$$

In the embodiment shown in FIG. 2, three objects 2 are located behind each other in a unit 13 consisting of six objects. The distance here is therefore $$D > = 3d + e$$

As FIG. 3 shows, units 14 with eight objects, where four objects 2 are located behind each other, can also be separated on this apparatus. All that needs to be done to make this possible is to change the distance between the two star wheels 5,7 to $$D >= 4d + e$$

The embodiment in FIG. 4 shows an apparatus where pairs of star wheels 5,15 and 7,17 are attached to a common drive shaft above each other. The two star wheels located above each other engage objects that are also located above each other, the top ones resting on the bottom ones and the bottom ones resting on the conveyor belt 1. This means that two-tier arrangements can also be separated simply and effectively.

I claim:

1. An apparatus for transporting and separating objects that are transported in a continuous row on a conveyer belt or similar device and are separated into collated units for further processing, wherein said apparatus comprises:
    a first star wheel (5), a second star wheel (7) and at least one continuous row of objects, wherein the second star wheel is located downstream of the first star wheel in the direction of transport of the continuous row of objects along the conveyer belt;
    wherein said first star wheel (5) is driven slower than the speed of the conveyer belt and the second star wheel (7) moves at a speed not slower than the speed of the first star wheel and at most at the speed of the conveyer belt;
    said first star wheel engaging the objects in the continuous row before the units are separated and said second star wheel engaging the objects after the units have been separated;
    wherein the distance between the center of rotation of the two star wheels can be adjusted and is set to be equal to or greater than the length of the units which require separation.

2. An apparatus according to claim 1, wherein the speed of the second star wheel (7) is higher than the speed of the first star wheel (5).

3. An apparatus according to claim 1 wherein the second star wheel (7) is provided with a perimeter and the perimeter of said second star wheel is provided with at least as many recesses (6) located behind each other as the number of objects in the collated units, after which a projecting section (8) is provided, the width of which projecting unit corresponds to the gap between the collated units.

4. An apparatus according to claim 1, wherein pairs of star wheels (5, 15 and 7, 17) that are identical and are located on a common drive shaft (center of rotation 9, 10) are provided above each other.

5. An apparatus according to claim 1, wherein the second star wheel has a longer diameter than the first star wheel.

6. An apparatus according to claim 3 wherein the length of the units which require separation is determined by multiplying the number of objects (f) located behind each other in the collated unit by the diameter (d) of the objects and by then adding to this the width of the projecting section (8) on the second star wheel (7).

* * * * *